United States Patent [19]

Krol et al.

[11] 4,137,477
[45] Jan. 30, 1979

[54] ELECTRODES, FOR EXAMPLE GRID-LIKE ELECTRODES FOR USE IN ELECTRON TUBES, AND A METHOD FOR MANUFACTURING SAME

[75] Inventors: Johannes W. A. Krol, Valkenswaard, Netherlands; Bernhard Lersmacher, Aachen; Hans Lydtin, Stolberg; Horst Seifert, Hamburg, all of Fed. Rep. of Germany

[73] Assignee: U.S. Philips Corporation, New York, N.Y.

[21] Appl. No.: 798,315

[22] Filed: May 19, 1977

[30] Foreign Application Priority Data

May 28, 1975 [DE] Fed. Rep. of Germany ....... 2623828

[51] Int. Cl.² .......................... H01J 1/46; H01J 17/04; H01J 17/38; H01J 21/10
[52] U.S. Cl. .................................... 313/348; 252/502; 29/25.18
[58] Field of Search ........................ 313/348; 252/502; 29/25.18, 25.17

[56] References Cited

U.S. PATENT DOCUMENTS

| 3,109,712 | 11/1963 | Redfern | 252/502 |
| 3,995,188 | 11/1976 | Gerlach et al. | 313/348 |

FOREIGN PATENT DOCUMENTS

465639  2/1971  Japan ...................................... 313/356

*Primary Examiner*—Saxfield Chatmon, Jr.
*Attorney, Agent, or Firm*—David R. Treacy; Algy Tamoshunas

[57] ABSTRACT

Disclosed are grid electrodes of glassy carbon which have good mechanical and electrical properties and can be manufactured in a simple manner with a great dimensional stability. The grid electrodes may be made by two alternative methods. In one method a body of cured synthetic resin is formed or processed into the shape of the desired electrode, after which it is carbonized. In the second method a preshaped body of cured synthetic resin which is in the unprocessed state, is carbonized after which the resulting glassy carbon body is further processed to the desired electrode, preferably by laser beam cutting.

8 Claims, 3 Drawing Figures

ELECTRODES, FOR EXAMPLE GRID-LIKE ELECTRODES FOR USE IN ELECTRON TUBES, AND A METHOD FOR MANUFACTURING SAME

The invention relates to electrodes particularly for electron tubes. More particularly, this invention relates to solid carbon electrodes for use in electron tubes and to a method for their manufacture.

The electrode may have a flat or curved surface, or it may be in the form of a cylinder or of a spherical segment or it may have any shape suitable to the geometry of an electron tube.

Electrodes, for electron tubes (hereinafter referred to as grid electrodes) which are made of solid carbon have a number of advantages in comparison with grid electrodes of different materials, for example metals, in particular, when they are used in high vacuum electron tubes. A few of these advantages are: low thermal and secondary electron emission, very high resistance to thermal shock, comparatively good thermal and electrical conductivity, no melting, high sublimation temperature (carbon vapour pressure at 2500° K approximately $10^{-6}$ atm., at 2000° K approximately $10^{-10}$ atm.) and hence high permissible operating temperatures, as well as an increasing mechanical rigidity at higher temperatures.

From German Offenlegungsschrift, No. 25 58 583 it is known to use electrographite as a material for the grid. However, the manufacture of such electrodes is impeded in that electrographite is a granular, very fragile and more or less porous material having a ceramic character. In spite of being a material which is easily processed, very thin-walled parts and parts having small transverse dimensions cannot be manufactured or can be manufactured only with great difficulty. The expressions "very thin-walled" and "small transverse dimensions" are to be understood to mean in this connection linear or transverse dimensions which in part are considerably smaller than 1 mm. For certain types of grids in the microwave range, for example, grid rods may have cross-sections of $100^2/\mu m^2$ or less with lengths of 1 cm or more. Such dimensions cannot substantially be realized even when using fine-granular electrographite. In addition, electrographite presents the difficulty that even with a small deformation — as, for example, caused by thermal expansion and contractions — small particles crumble away and interfere with the operation of the tube.

German Patent Specification No. 11 94 988 discloses a grid electrode assembly consisting of a pyrolytic graphite foil having holes, slots or similar recesses. Pyrolytic graphite is prepared by deposition of material from a thermally decomposible gaseous phase. By adjusting the process parameters such as pressure and temperature, a highly preferred orientation can be obtained in the deposited carbon so that the properties of the layer thus formed very closely approach those of a single crystal of graphite. An important characteristic feature of the layers of pyrolytic graphite is a pronounced anisotropy of the physical properties in which the anisotropy of the electrical and the thermal conductivity is very favourable for the application in grid electrodes. A disadvantage, however, of the material deposition from thermally decomposable gaseous phases is that high precision requirements with respect to dimensions, wall thicknesses, size tolerances etc. can only be met with great difficulty, in particular when manufacturing molded bodies having a complex geometry. For example, for bodies from which grid electrodes are to be manufactured, wall thicknesses of 150 /$\mu$m with a wall thickness tolerance of $\pm 10$ $\mu$m are required with an overall lengths of up to 100 mm and diameters of approximately 10 to 50 mm. Such high precision requirements may cause a very unfavourable relationship between costs and efficiency (number of pieces per batch, quality).

Furthermore, German Offenlegungsschrift No. 23 58 583 discloses a grid electrode whose portion forming the actual grid consists of carbon yarns or wires which are covered entirely with pyrolytic graphite. Although this grid electrode has the advantage that the dimensions of the grid rods are not restricted, as is the case of machined graphite hollow cylinders, by the performance of the tools and/or the quality of the graphite, yarns or wires and used in the construction of wire grids, however, which have been manufactured by carbonization of cellulose, polyacrylnitrile or artificial silk. These carbon yarns or wires are generally polycrystalline, even when they seem to be amorphous (X-ray radiation) and therefore, have grain boundaries. This has an unfavourable influence on the thermal and electrical conductivity as well as on its mechanical rigidity. In particular the processing of polycrystalline carbon wires to grid structures is adversely influenced by their lack of stiffness.

One object the present invention is to provide an electrode which has good mechanical and electrical properties and which can also be manufactured in a simple manner and with a great dimensional stability.

According to the present invention there is provided an electrode of the aforesaid kind, in particular a grid-shaped electrode, of solid carbon for electron tubes, in which at least the part forming the actual grid consists of glassy carbon.

Glassy carbon is a paracrystalline substance and is known per se, for example, from Chem. Ing. Techn. "42 (1970) pages 659-669. This article describes a paracrystalline carbonaceous substance of low density (approximately 1.5 g/cm$^3$) which can be manufactured from a series of organic high polymers by solid state pyrolysis. The most important features of the aforesaid glassy carbon or paracrystalline carbon are physical properties determined by the structure in which the type of starting material is substantially irrelevant. That is, although the process may be varied in dependence upon the starting material, it is substantially impossible to determine the starting material from the properties of the final product by physical and chemical methods. Glassy carbon with substantially the same properties may therefore be manufactured from a variety of starting polymers, for example, polyvinylidene chloride, phenol- or cresolresoles and Novolaks, polyimides, regenerated cellulose, polymerized furfuryl alcohol, coal tar, and so on (suitability criteria are described in detail below).

The advantage of grid electrodes of glassy carbon as compared with similar electrodes of other solid carbons may be described as follows: glassy carbon is pure, elementary carbon which, with respect to its atomic bonding character, can finally be reduced to the graphite modification. That is, its thermal, electrical and electronic properties, respectively, are comparable to those of graphite. However, compared with all the graphitic solid carbons, its extra-ordinarily large mechanical rigidity is decisive and its relatively great hardness and resistance to detrition is of particular value. On the basis of its particular properties, glassy carbon can readily be processed to more or less complicated shapes, which grid electrodes generally have, with sufficient stability and an excellent surface quality.

A criterion for the suitability of an organic high polymeric substance as a starting material for the manufacture of glassy carbon is that the pyrolytic decomposition occurring during heating begins at a temperature which is below the softening temperature or melting temperature, as well as below the sublimation temperature or depolymerization temperature. This requirement is generally satisfied by irreversibly hardening synthetic resins, that is duroplasts. Upon polycondensation, addition polymerization and other polymerization processes, duroplasts combine via major valences to form cross-linked macromolecules. A particular characteristic group of irreversibly hardening polycondensates are the phenol resols and cresol resols and Novolaks. These are also very suitable for the manufacture of glassy carbon.

Thermoplasts such as, polyamides, polyethylenes, polyvinylchloride, etc. are unsuitable according to the above-mentioned criterion for they generally melt and-/or depolymerize prior to the beginning of thermal decomposition. By chemical and physical measures, for example, oxidative cross-linking or by coating with a non-melting or non-depolymerizing coating, however, such materials may also be changed intermediately into duroplasts and the pyrolytic decomposition thereof to glassy carbon is then possible (see "Philips Technisch Tijdschrift" 36 (1976) No. 4, pages 109–119. This article describes a method of intermediary stabilization of thermoplastic foam material).

According to a further aspect of the invention there is also provided a method of manufacturing electrodes of the aforesaid kind in which a body of cured hardened synthetic resin is shaped or processed in a manner such so that it has the shape of the desired electrode, after which it is carbonized. The machining of the molded body of cured synthetic resin takes place, for example, by milling, drilling and/or turning. According to an alternative method of the invention, a pre-shaped body, possibly in the unprocessed state, of cured synthetic resin is carbonized and the resulting body of glassy carbon is then processed further to form the desired electrode. In this case, the further processing takes place, for example, by grinding, laser beam or electron beam cutting and/or spark erosion. Laser beam cutting is to be preferred.

Each of the two variations of the method for preparing an electrode according to the invention have advantages which have to be weighed against each other for each individual case. The great advantage of the first variation is that the polymeric starting material can be readily machined. The "tolerance of uncertainty" as determined by shrinkage is however a disadvantage in this method. The former method may be used only in those cases in which large tolerances, larger than approximately 1.0 mm, are permissible, for example, in coarse-mesh triode grids of large dimensions. Normally, an aftertreatment (fine machining) of the carbonized grid body cannot be avoided. Thus, this applies in particular to fine-mesh grids having small size tolerances (smaller than 1 mm) in particular also in tubes having several grids (tetrodes, pentodes) with high precision requirements with respect to the grid distances (1.0 to 0.1 mm in UHF power tubes).

In the second variation of the method in which a body of glassy carbon is processed to the desired electrode, it may be sufficient to subject the electrode subsequently to an annealing treatment at 700 to 1200° C in a reactive atmosphere. Such an annealing treatment is proposed in German Patent Application No. P 26 13 170.4.

Suitable materials for carrying out the method according to the invention are pre-condensated solid phenol-resol in powder form or liquid phenol resol or mixtures of pre-condensated furfuryl alcohol with phenol resols. In one embodiment of the method a moulded body of cured synthetic resin with a gridlike hollow body is manufactured by winding strands or wires or interweaving strands of phenol resin in the form of a network or mesh (or, in the case of flat grids by interweaving the wires in the form of a flat network). Strands are then carbonized. It is very advantageous to manufacture the starting bodies by deep drawing sheets, plates or foils of polymeric material. Very suitable for this technique are phenol resin plates and foils and polyimide foils.

In order to obtain the correct dimensions of the unprocessed synthetic bodies which have to be further processed to grid electrodes, any shrinkage which may occur during the subsequent carbonization process should be allowed for. This shrinkage may be from 20 to 30% of the dimensions of the starting material in the linear direction.

The carbonization is carried out by means of known methods, which can be summarized as follows: the pre-shaped body is subjected in an inert gas atmosphere ($N_2$, Ar) or, by a vacuum in a process comprising one or several steps, to a temperature treatment up to at least 1000° C, preferably, however, at 1600° C, or in particular cases to at least 2500° C (for example 3000° C). The heating step should be carried out in a manner such that all parts of the body to be carbonized are always at the same temperature. This avoids temperature gradients in the material and the associated interferences (for example mechanical stresses). The heating rate of this isothermal heating method is determined by the thickness of the body since, thin-walled parts are more rapidly brought to the "isothermal state" than thick-walled parts. However, the most important process determining the speed is as follows: with increasing temperature the starting material starts to decompose (pyrolysis). The atomic and molecular fractions of the resulting decomposition products must leave the body via solid state diffusion. It may not lead to local agglomerations of decomposition products in the volume which in the case of exceeding a given vapour pressure might cause the body to be cracked. The heating conditions are determined in that the first-mentioned "temperature diffusion" for adjusting isothermal ratios takes place much more rapidly than the "out-diffusion" of the volatile decomposition products. Thus, it always holds that: $\lambda/\rho.c >> D$ (dimension cm$^2$/s; $\lambda$ is coefficient of thermal conductivity; $\rho$ = specific gravity; c = specific heat; D = diffusion coefficient. For the practice of the manufacture of glassy carbon this means that for wall thicknesses up to 0.2 mm, the transformation "polymer → carbon" can take place at heating rates of approximately 100° C/hour, whereas with each doubling of the wall thickness (shortest diffusion length) the rate of heating decreases by a quanter (for a wall thickness of 1 mm a heating rate holds of approximately 4° C per hour corresponding to 250 hours for a temperature limit of 1000° C). Heating may then be carried out more rapidly because the pyrolytic decomposition has substantially terminated. In the process which comprises several steps and which will be described in greater detail with reference to the examples, temperatures up to 2000° C and higher are achieved in this further heating.

Grid electrodes of glassy carbon, as compared with similar electrodes of graphite and in particular of pyrolytic graphite, have a smaller thermal and electric conductivity. In many cases these disadvantages can be compensated for entirely or partly by corresponding proportioning of the wall thicknesses. Furthermore it is possible to vary the conductivities within certain limits by incorporating a second, disperse phase (for example of metal particles or of graphite wires).

The conductivities can be influenced favourably, by providing a thin layer (approximately 1 to 10 $\mu$m thick) of highly oriented pyrolytic graphite due to the depth of penetration in the microwave range ($1 \geq 1000$ MHz) ("Skin" effect). In this case the pre-shaped grid of glassy carbon serves as a substrate for the deposition of pyrolytic graphite and is surrounded on all sides by said graphite (composite electrode).

Grid electrodes of glassy carbon form a completion to the series of electrodes on the basis of solid carbon. The advantage thereof are: the multiplicity of possible starting materials; the simple deformability and processability thereof; the possibility of manufacturing parts with great precision and very small tolerances; very large mechanical rigidities and extraordinarily good surfaces.

The invention will now be described in greater detail with reference to the drawing and a few examples. In the drawing.

Figure 1:
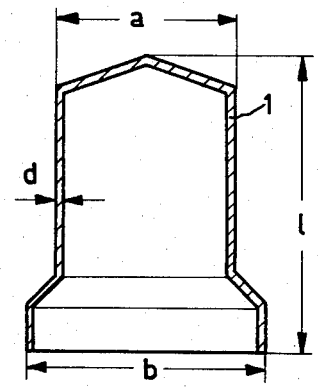
FIG. 1 is a longitudinal sectional view of a body from which a grid electrode is to be manufactured.

FIG. 1 illustrates the high precision requirements which are imposed upon the manufacture of grid electrodes. For example, for a body 1 from which a grid electrode is to be manufactured, a wall thickness d of 150 $\mu$m with a wall thickness tolerances of $\pm$ 10 $\mu$m is required with an overall length 1 of approximately 50 mm and diameters a and b of approximately 30 mm and 40 mm.

The carbonizations stated in the following examples were carried out in a process comprising two stages or, optionally, three stages, namely Stage 1. The actual pyrolysis, so the transformation "polymer → carbon" in an inert atmosphere up to approximately 800° C (in some cases up to 1000° C);

Stage 2. The after-treatment in a vacuum up to 1600° C to remove remaining impurities and in particular also hydrogen;

Stage 3. If desired (in the case of a requirement of particular purity) a second after-treatment step in a vacuum ($10^{-3}$ mm mercury column and smaller) up to at most 2800° C.

The inert atmosphere used in stage (1) is preferably slowly flowing nitrogen gas which simultaneously removes the gaseous decomposition products from the reaction vessel. The upper treatment temperatures of 800° C (and in certain circumstances of 1000° C) in the first stage enables furnaces with normal tantalum wire heating windings to be used.

Stage (2) is preferably carried out in a vacuum furnace with a graphite heating element. It has been found that treatment temperatures up to approximately 1600° C are generally sufficient to remove remaining contaminants. The temperature rise is at a rate between 100 and 200° C/hour dependent on the shapes of the samples and the wall thicknesses.

Stage (3) is carried out only in certain cases. In a vacuum furnace of the type which corresponds to that of stage 2) the temperatures are raised by approximately 500° C per hour up to 2000 to 2800° C.

EXAMPLE 1.

A weighed quantity of a precondensated solid phenol resin
 (a) in powder form and
 (b) as a granulate is provided, respectively, in a mould of hardened heat-resistant steel. The surface of the mould which contacts the subsequently moulded body is preferably polished. Furthermoe, in order to prevent adhesion of the mould to the synthetic resin, the surface of the mould may be provided with a release agent. The mould is heated to approximately 150° C at a pressure of a few atmospheres (10 to 100 atmospheres). The heating duration is determined in the first instance by the wall thicknesses of the moulded body and will generally not exceed a few minutes. The mould may be constructed so that grid apertures are moulded in the body prior to the moulding process. The above-described moulding technique corresponds to a known method used in the manufacture of bakelite which has long proved to be suitable. Carbonization of the resin is then carried out as follows: a moulded body having a wall thickness of 0.3 mm is heated in a nitrogen atmosphere in a furnace with a temperature rise of 20° C per hour in 40 hours to 800° C and then cooled to 20° C in approximately 12 hours. After this treatment the partly processed grid body has undergone a linear shrinkage of approximately 25% which does not change noticeably in a second thermal treatment step. In the second stage of the treatment the body is heated to a final temperature of 1600° C in a vacuum (approximately $10^{-3}$ mm mercury column) and a heating rate of 200° C/hour and is then cooled to ambient temperature within 24 hours.

EXAMPLE 2.

A defined quantity of a liquid phenol resol having a initial viscosity of approximately 5000 cP is drawn into a mould corresponding to the body to be manufactured under a low pressure vacuum (10° to $10^{-1}$ mm mercury column). The resol is then cured and removed from the mould in known manner. The same method can be carried out according to the known injection moulding processes. Carbonization is then carried out as described in Example 1.

EXAMPLE 3.

Figure 2:
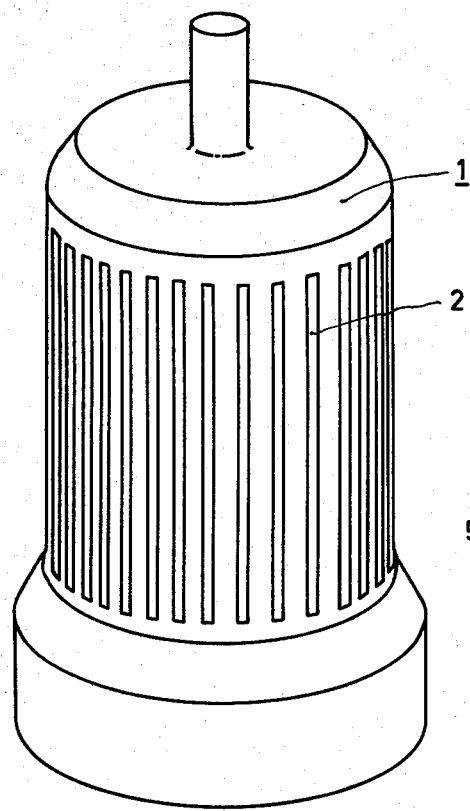
FIG. 2 shows an unprocessed body corresponding to the grid electrode to be manufactured (compare Example 3)

An untreated body 1 corresponding to the grid electrode to be manufactured is manufactured from a solid block of cured phenol resin by a machining treatment (see FIG. 2). The grid apertures 2 may be provided either prior to or after the carbonization.

EXAMPLE 4.

Figure 3:
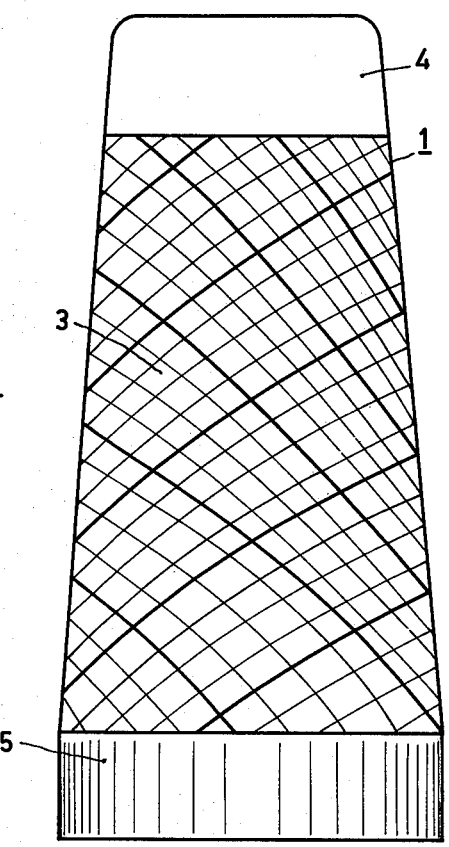
FIG. 3 shows a wire grid electrode of glassy carbon (compare Example 4).

A grid-like hollow body 1 is manufactured by winding phenol resin strands 3 (see FIG. 3) having a diameter of 30 to 1000 μm into the form of a mesh according to a known winding technique used for winding metal wire grids. Phenol resin strands and strands of glassy carbon, respectively, are manufactured with diameters in the range of 30 μm to 3 mm. The solid parts 4 and 5 of the grid electrode shown in the Figure may consist both of glassy carbon and of other materials, for example, molybdenum, tantalum, graphite or pyrographite. The wire winding may be connected at all or at each separate crossing by gluing. The connections may be made by treatment with, for example, phenol resin glues; by the attack of the crossings by an agressive solvent (for example CH$_2$Cl$_2$, acetone, acetic acid methyl ester, and so on) and squeezing, a composite may also be manufactured. It is also advantageous to use resin strands which, although rendered solid by a thermal treatment, have not yet been fully cured or condensed (resitol state). By a corresponding thermal treatment after winding, the remaining reaction up to complete curing (resitol state) under pressure may be carried out. As a result of this stabilization, a connection at the crossings similar to a "weld" is obtained. Carbonization as already described is then carried out.

EXAMPLE 5.

A body required for further processing to a grid electrode is manufactured by deep drawing a thin plate or foil of a duro-plastic high polymeric material. In this process
both precondensated and condensated phenol resins are used. Of particular importance in this method are
polyimide foils which show a particularly favourable carbonization behaviour.

The deep drawing method is based on the fact that substantially all the thermosetting materials have a given temperature range in which they can be plastically deformed when exerting external forces. This plasticity range (macro-Brown-movement) of very many polymers lies at approximately 200 to 250° C. The untreated bodies formed from foils are carbonized in accordance with the above-described relationships of wall thicknesses and heating rates.

What is claimed is:

1. A method of making a glassy carbon grid electrode for an electron tube comprising the steps of forming a sheet of synthetic resin into a body of a shape corresponding to that of the desired electrode, forming a plurality of grid apertures in said body, gradually heating said body to a temperature between 800° C and 1000° C at a rate which is dependent on the thickness of said body and is sufficiently low to maintain a substantially uniform temperature throughout said body during said heating to thereby transform said synthetic resin into glassy carbon, subsequently heating said body to a temperature of at least 1600° C at a rate between approximately 100° C per hour and 200° C per hour, and cooling said body to ambient temperature.

2. The method according to claim 1 including the step of cooling said body prior to said subsequent heating step.

3. The method according to claim 2 wherein said synthetic resin is polyimide.

4. The method according to claim 3 wherein said step of forming includes deep drawing said sheet to form a generally cylindrical hollow body.

5. A method of making a glassy carbon grid electrode for an electron tube comprising the steps of interweaving strands of synthetic resin to form a mesh, gradually heating said mesh to a temperature between 800° C and 1000° C at a rate which is dependent on the thickness of said strands and is sufficiently low to maintain a substantially uniform temperature throughout said strands during said heating to thereby transform said synthetic resin into glassy carbon, subsequently heating said mesh to a temperature of at least 1600° C at a rate between approximately 100° C per hour and 200° C per hour, and cooling said mesh to an ambient temperature.

6. The method according to claim 5 wherein said synthetic resin is a phenol resin.

7. The method according to claim 6 including the step of cooling said mesh prior to said subsequently heating step.

8. The method according to claim 7 wherein said gradual heating step is carried out in an inert atmosphere and said subsequent heating step is carried out in a vacuum.

* * * * *